United States Patent [19]

Crocker

[11] Patent Number: 4,786,560
[45] Date of Patent: Nov. 22, 1988

[54] ANTISTATIC POLYMERIC ARTICLE
[75] Inventor: Christopher Crocker, Lancashire, England
[73] Assignee: Imperial Chemical Industries PLC, London, England
[21] Appl. No.: 812,904
[22] Filed: Dec. 23, 1985
[30] Foreign Application Priority Data
Dec. 21, 1984 [GB] United Kingdom ............... 8432488
[51] Int. Cl.$^4$ ...................... B32B 27/00; D06M 13/18
[52] U.S. Cl. ................................... 422/500; 428/323; 428/903.3; 428/483; 428/516; 428/910; 428/922; 428/328; 428/331; 427/171; 264/176.1
[58] Field of Search ...................... 428/500, 910, 922

[56] References Cited

U.S. PATENT DOCUMENTS 3,063,870 11/1962 Wakeman et al. ............... 428/922 X
3,827,931 8/1974 Rothwell et al. ............... 428/922 X
4,139,473 2/1979 Hochreuter ........................... 252/8.9

FOREIGN PATENT DOCUMENTS 2296673 7/1976 France .
1487374 9/1977 United Kingdom .

Primary Examiner—P. C. Ives
Attorney, Agent, or Firm—Cushman, Darby & Cushman

[57] ABSTRACT

An antistatic article comprises a thermoplastics polymeric substrate having at least one surface layer comprising (a) a polychlohydrin ether of an ethoxylated hydroxyamine and (b) a polyglycol diamine, the total alkali metal content of components (a) and (b) not exceeding 0.5% of the combined weight of (a) and (b).

Articles such as fibres, filaments, sheets and films, particularly polyester films, are thereby rendered antistatic without detriment to the optical characteristics thereof.

8 Claims, No Drawings

ANTISTATIC POLYMERIC ARTICLE

This invention relates to an antistatic thermoplastics polymeric article and to a process for the production thereof.

By an "antistatic article" is meant a treated thermoplastics polymeric article exhibiting a reduced tendency, relative to an untreated article, to accumulate static electricity on a surface thereof.

Articles according to the invention comprise fibres, filaments, sheets, films and the like, but for ease of discussion the invention is hereinafter described with reference to films.

The tendency of polymeric articles, such as films, to accumulate detrimental static electrical charges on surfaces thereof is well known. The presence of such charges creates a variety of problems including the attraction of dust and other contaminants to the film surface, the creation of a potential explosion hazard in the presence of organic solvents, difficulties in feeding the films through film handling and treating equipment, blocking, i.e. adhesion of the film to itself or to other films, and the risk of fogging subsequently applied light-sensitive coating layers. Consequently, it has been proposed to improve the electrical surface conductivity of polymeric films by treating the film with one or more of a variety of antistatic agents, the selected antistatic agent either being applied directly to a surface of the film, suitably in a volatile coating medium, or being incorporated into the polymeric material prior to fabrication of a film therefrom in the expectation that the antistatic agent will eventually migrate to a surface of the film.

Antistatic agents hitherto proposed for use in association with polymeric articles are generally of two kinds - an internal agent incorporated into the polymer from which the article is subsequently fabricated, or a topical agent applied directly to a surface of the article. Many such agents are available but their use is generally subject to a variety of constraints.

Many internal antistatic agents, of which nitrogeneous materials are particularly effective, tend to degrade at the temperatures employed in processing relatively high melting polymers, such as polyethylene terephthalate. Such agents are therefore commonly employed in the protection of polymers capable of being processed at relatively low temperatures—for example, polyvinylchloride, polystyrene and polyolefins. Furthermore, the relatively high concentration at which such agents must be present to provide effective antistatic behaviour is usually such as will interfere with the orientation behaviour of the polymer, thereby adversely influencing the physical characteristics, such as dimensional stability, tensile strength and light transmission, of oriented articles produced therefrom.

Topical antistatic agents suitable for application to a polymeric surface from a suitable coating medium are conveniently considered in three distinct categories:

(a) Agents which function by providing a continuous electrically-conductive layer of at least monomolecular thickness on a polymeric substrate. These agents, such as metallic flakes or fibres, sintered metal oxides, or carbon, usually embedded in a resinous binder medium, confer particularly effective antistatic characteristics but adversely affect the light transmission and haze characteristics of the polymeric product.

(b) Monomeric agents, such as ionic salts and surfactants, which function by absorption of moisture and therefore tend to confer poor antistatic characteristics at low relative humidity, generally lack durability unless incorporated into a binder resin on the surface of the treated article. Even so, such agents, having a tendency to be soluble in water, are readily leached from the binder during subsequent processing in aqueous media. Thus, simple alkali metal salts, such as sodium chloride, sodium bromide and potassium ethyl phosphate, are usually ineffective at low relative humidity, and can be removed from the substrate by aqueous media.

Quaternary ammonium salts, although providing effective antistatic characteristics, usually impede reclaimability of scrap polymeric products, particularly film scrap, by virtue of intense yellowing under the influence of heat during re-extrusion, thereby rendering the (film) production process uneconomical.

Nonionic surfactants, such as polyethylene glycols and alcohol ethoxylates, are generally not particularly effective as antistatic agents, while anionic surfactants, such as the sodium salts of sulphated alcohols and sulphonated alkyl phenol condensates, require the presence of a binder to confer durability and generally confer poor antistatic characteristics at low relative humidity. cationic surfactants, such as amine ethoxylates, like the aforementioned quaternary ammonium salts, generally impede reclaimability of scrap polymeric products treated therewith.

(c) Electroconductive polymers, such as sodium carboxylates, polystyrene sulphonic acid, and poly-N-(methacryloyloxyethyl)-tri-methyl ammonium chloride are often applied in the photographic industry by off-line-coating techniques. However, they are not particularly suitable for use in pre- or inter-draw film coating techniques because they generally have a high glass transition temperature, thereby requiring the presence of a plasticiser (to promote film formation) which tends to reduce adhesion to the film substrate. Such electroconductive polymers also tend to be hygroscopic and/or tacky and therefore may require the addition of a filler to improve slip and blocking behaviour of the treated article. In addition, certain electroconductive polymers, such as polyacrylic acid and polystyrene sulphonic acid, may give rise to speck and gel formation during re-extrusion of coated scrap, and therefore preclude reclamation of scrap films.

We have now devised an improved antistatic film which eliminates or substantially overcomes the aforementioned difficulties.

Accordingly, the present invention provides an antistatic article comprising a self-supporting thermoplastics polymeric substrate having on at least one surface thereof an antistatic layer wherein the antistatic layer comprises (a) a polychlorohydrin ether of an ethoxylated hydroxyamine and (b) a polyglycol diamine, the total alkali metal content of components (a) and (b) not exceeding 0.5% of the combined weight of (a) and (b).

The invention further provides a method of producing an antistatic article comprising forming an article from a thermoplastics polymeric material, and depositing onto a surface of the formed article an antistatic composition comprising (a) a polychlorohydrin ether of an ethoxylated hydroxyamine and (b) a polyglycol diamine, the total alkali metal content of components (a) and (b) not exceeding 0.5% of the combined weight of (a) and (b).

In a preferred embodiment, the invention still further provides a method of producing an antistatic film comprising forming an extrudate of a thermoplastics polymeric film-forming material, molecularly orienting the extrudate by drawing it in at least one direction to form a self-supporting film and forming on at least one surface of the oriented film an antistatic layer wherein the antistatic layer comprises (a) a polychlorohydrin ether of an ethoxylated hydroxyamine and (b) a polyglycol diamine, the total alkali metal content of components (a) and (b) not exceeding 0.5% of the combined weight of (a) and (b).

By an "alkali metal" is herein meant an element of Group I-A of the Periodic Table of the Elements displayed on page B3 of the Handbook of Chemistry and Physics, 46th edition, (The Chemical Rubber Company).

By a "self-supporting" film is meant a film capable of independent existence in the absence of a supporting substrate.

A polychlorohydrin ether of an ethoxylated hydroxyamine for use as component (a) of the antistatic layer is preferably a compound of the formula:

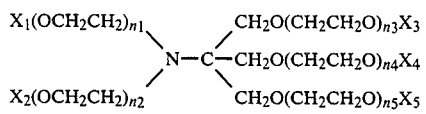

wherein each of $n_1$, $n_2$, $n_3$, $n_4$ and $n_5$ is an integer and the sum of $n_1$, $n_2$, $n_3$, $n_4$ and $n_5$ is from 5 to 20, preferably from 10 to 15, and particularly 13, and each of $X_1$, $X_2$, $X_3$, $X_4$ and $X_5$ which may be the same or different, is-H or —$CH_2CH(OH)CH_2Cl$, with the proviso that at least one, and preferably two or more, of $X_1$, $X_2$, $X_3$, $X_4$ and $X_5$ is —$CH_2CH(OH)CH_2Cl$. Such a compound may be prepared by ethoxylating tris(hydroxymethyl)aminomethane followed by reaction with epichlorohydrin, as disclosed in British Patent No. GB1487374.

A polyglycol diamine for use as component (b) of the antistatic layer is preferably a compound of the formula:

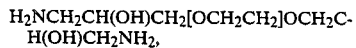

wherein $n_6$ is an integer of from 4 to 80 and preferably from 6 to 14. A compound of this kind is conveniently prepared by treating polyethylene glycol with epichlorohydrin followed by reaction with ammonia in the presence of a base, such as sodium hydroxide.

A film coated with a solution or dispersion of an antistatic medium comprising components (a) and (b) prepared as hereinbefore described, has been observed to exhibit an undesirable powdery surface bloom after the applied coating has been dried. This surface bloom not only impairs the optical clarity of the resultant film, but may also be wiped off during, and in a manner which interferes with, subsequent processing of the film. Surprisingly, we have found that this problem may be overcome, while retaining excellent antistatic performance, by subjecting the antistatic composition to a deionising treatment prior to its application onto a surface of the film.

Preparation of one mole of component (b), as hereinbefore described, will simultaneously yield 2 moles of an alkali metal chloride, such as sodium chloride and it is believed that elimination of the residual alkali metal chloride from the antistatic medium by the deionising treatment is necessary to avoid the subsequent appearance of bloom on the surface of the treated film.

Desirably, the alkali metal content of the antistatic composition should not exceed 0.5%, preferably 0.3%, and particularly preferably 0.16%, of the combined weight of components (a) and (b). These levels are conveniently achieved by dissolving the antistatic medium in a suitable solvent and removing a portion of the alkali metal content by filtration, followed by a deionising treatment in a suitable ion-exchange column.

Components (a) and (b), which are preferably present in the antistatic layer as hydrogen chloride salts, may be employed as a simple mixture or in the form of a water-soluble, partial condensate obtained, for example, by dissolving the components in water or an aqueous-organic medium and effecting partial condensation by stirring at a temperature of less than about 100° C., and preferably at ambient temperature, until the desired degree of condensation has been achieved. The partial condensation reaction may be terminated by diluting the reaction mixture with water, or preferably with an acid, such as hydrochloric acid, when the viscosity of the reaction mixture has increased to a level indicative of an acceptable degree of condensation. Either the mixture or the partial condensate is capable of being cross-linked, for example by heating, to improve durability of the antistatic layer.

The relative proportions of the respective components of the antistatic layer may vary within a wide range, and desirably should be selected by simple experimentation to provide an antistatic layer which confers upon the film a Surface Resistivity not exceeding 12, and preferably less than 11.5 logohms/square at 54% Relative Humidity. Desirably, components (a) and (b) are present in a weight ratio of from about 0.5:1 to 5:1.

The antistatic layer may be formed on a surface of the substrate by conventional techniques—for example, it is preferred, particularly in the case of a polyester film whose formation requires relatively high extrusion temperatures, to deposit the antistatic layer directly onto at least one surface of a preformed film substrate from a solution or dispersion in a suitable volatile medium—preferably, for economy and ease of application, from an aqueous medium.

The concentration of the antistatic components in the liquid coating medium depends, inter alia, on the level of antistatic properties required in the treated film, and on the wet thickness of the applied coating layer, but an effective amount conveniently comprises from about 0.5 to about 10%, preferably from 1 to 5% (weight-/volume).

If desired, the optical characteristics and processing behaviour of an article according to the invention may be improved by incorporating therewith a minor amount of a modifier salt. Preferred modifier salts comprise a cation selected from the elements of Groups I-A, II-A, III-A and IV-B of the Periodic Table of the Elements, as hereinbefore defined. A modifier, if employed, is conveniently incorporated into the antistatic coating medium, and may be present in an amount such that the concentration of the cation is up to 0.3%, especially from about 0.05 to 0.25% by weight of components (a) and (b). Typical modifiers include salts such as the hydroxides and halides, especially chlorides, of sodium, calcium, aluminium and zirconium.

If desired, the coating medium may additionally comprise a minor amount, for example 0.5 to 4.0%, by weight of components (a) and (b), of a surfactant, such as an ethoxylated alkyl phenol, to assist wetting of the antistatic coating composition on the film surface.

If desired, and preferably, the coating medium incorporates a particulate material to improve the slip, antiblocking and general handling characteristics of the film. The slip agent may comprise any particulate material which does not film-form during film processing subsequent to coating, for example—inorganic materials such as silica, china clay and calcium carbonate, and aqueous dispersions of organic polymers having a high glass transition temperature, for example—polymethyl methacrylate and polystyrene. The preferred slip agent is silica which is preferably employed as a colloidal sol containing particles of mean diameter 12–125 nm. The amount of slip additive is preferably in the range of from 10 to 40% of the dry weight of coating.

The coating medium may be applied to a film surface by conventional coating techniques. The applied coating medium is subsequently dried to remove the volatile medium and also to effect cross-linking of the antistatic components. Drying may be effected by conventional techniques—for example, by passing the coated film through a hot air oven. Drying may, of course, be effected during normal post-formation film-treatments, such as heat-setting. The dried coating conveniently exhibits a dry coat weight of from about 0.1 to about 2.0, preferably from 0.2 to 1.0, mg/dm$^2$.

The substrate of a film according to the invention may be formed from any thermoplastics, film-forming polymeric material. Suitable materials include a homopolymer or copolymer of a 1-olefin, such as ethylene, propylene and butene-1, (which may require a conventional pretreatment (e.g. corona discharge) of the film surface to promote adhesion of the antistatic medium) or a synthetic linear polyester which may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-biphenyldicarboxylic acid, hexahydroterephthalic acid or 1,2-bis-p-carboxyphenoxyethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol. Polyethylene terephthalate films are particularly preferred especially those films which have been biaxially oriented by sequential stretching in two mutually perpendicular directions typically at temperatures in the range 78° to 125° C. and preferably heat set typically at temperatures in the range 150° to 250° C., e.g. as described in GB patent specification No. 838 708.

A film substrate according to the invention may be unoriented, or uniaxially oriented but is preferably biaxially oriented by drawing in two mutually perpendicular directions in the plane of the film to achieve a satisfactory combination of mechanical and physical properties. Simultaneous biaxial stretching may be effected by extruding a thermoplastics tube, cooling the extruded tube, reheating and inflating the tube to introduce transverse orientation, and elongating the tube by withdrawing the tube from the inflation zone more rapidly than it is introduced thereto. In such a simultaneous stretching process, the antistatic coating medium is preferably applied to the film before stretching is commenced. Sequential stretching may be effected in a stenter process by extruding the thermoplastics material as a flat extrudate and stretching the extrudate first in one direction and then in the other mutually perpendicular direction. Generally, it is preferred to stretch firstly in the longitudinal direction, i.e. the direction of passage through the stretching machine, and then in the transverse direction. The stretched films may also be dimensionally stabilised by heat-setting under dimensional restraint at a temperature above the glass transition temperature of the film-forming polymer but below the melting temperature thereof. As indicated above, a preferred thermoplastics film is produced from polyethylene terephthalate by sequential biaxial orientation and heat setting, e.g. as described in GB patent specification No. 838 708.

The antistatic coating medium may be applied to an already oriented film substrate. However, application of the coating medium is preferably effected before or during the stretching operation.

In particular, it is preferred according to this invention that the coating composition should be applied to the film between the two stages (longitudinal and transverse) of a biaxial stretching operation. Such a sequence of stretching and coating is especially preferred for the production of antistatic linear polyester films such as polyethylene terephthalate films which are preferably firstly stretched in the longitudinal direction over a series of rotating rollers, coated with the antistatic medium and then stretched transversely in a stenter oven, preferably followed by heat-setting.

Orientation of film by a stenter process generates large quantities of scrap film. For example, the edge portions of the film are damaged where gripped by the stenter clips, and must be recycled if the film production operation is to be economical. Pre- or interdraw coating, although beneficial in terms of improved coat adhesion, is generally detrimental to a scrap-recycling operation by virtue of the impaired appearance of films formed from an extruded blend of virgin polymer and recycled coated film. Relatively few coating media are suitable for recycling, particularly in the production of polyester films. However, an antistatic coating composition in accordance with the invention is particularly advantageous in a polyester film process in that scrap coated film and virgin polyester may be extruded together without significantly impairing the quality, colour or appearance of the resultant film.

A film according to the invention may comprise an antistatic layer on one or both surfaces of the polymeric substrate. A polyester substrate having an antistatic coating layer on both surfaces is particularly useful as a carrier for montage techniques as used in the printing industry where freedom from dust and dirt attraction is paramount; excellent light transmission and low haze are also required. A film having the antistatic layer on one surface only may be preferred for applications in which the reverse side of the film is coated, for example—to produce a masking film or a light-sensitive photographic or reprographic film.

Alternatively, a substrate may have an antistatic layer on one surface and a priming (or other) layer on the opposed surface—for example, to render the coated substrate receptive to light-sensitive photographic or reprographic coating lacquers, suitable for use as microfilms, or the like. A substrate with an antistatic layer on one surface and a slip coating on the other surface is also of utility.

Coating media suitable for use as the priming (or other) layer on the opposed surface of a one-side antistatic coated substrate include conventional primipg materials, such as a thermosetting acrylic or methacrylic composition or a copolymer of methyl methacrylate - acrylic acid or ethyl acrylate-methacrylic acid with a ureido polymer complex as described in British Patent No.1264338.

The films of the invention may conveniently contain any of the agents conventionally employed in the manufacture of thermoplastics polymeric films. Thus, agents such as dyes, pigments lubricants, anti-oxidants, surface active agents, gloss-improvers, prodegradants, and ultra-violet light stabilisers may be incorporated in the substrate and/or coating layer(s).

The films may vary in thickness depending on the intended application, but films having a thickness of from 5 to 250 microns are of general utility. Films intended for use in montage operations are suitably within a thickness range from 75 to 175 microns. The thickness of the antistatic layer is desirably within a range of from 0.01 to 0.2, preferably 0.02 to 0.1, micron.

The non-antistatic surface of the films may be subjected to conventional after-treatments -for example, a corona discharge treatment, to improve the bonding and coat-receptive properties of the film.

The invention is illustrated by reference to the following Examples, wherein the material identified as "ELFUGIN PF" (supplied by Sandoz Products Ltd), by applicant's analysis contains a mixture of a compound of type (a) with $n_1+n_2+n_3+n_4+n_5=$ ca. 13 and having 35 to 50% of $X_1+X_2+X_3+X_4+X_5$ as $-CH_2CH(OH)CH_2Cl$ (molecular weight ca.800), together with oligomers of molecular weights 1600–6500, and compounds of type (b) with $n_6$ ranging from 6 to 14. Both (a) and (b) are present mainly as their hydrochloride salts. The total amount of active organic matter is about 44% by weight. In addition the material contains 0.91% by weight sodium [i.e. about 2.1% by weight of components (a) and (b)]and 4.6% by weight chloride ion together with a trace of tin. The remaining material is ethyleneglycol.

EXAMPLE 1

1 liter of 'Elfugin' PF was deionised by diluting with 4 liters. of demineralised water and passing the solution under gravity successively through (i) a column containing DOWEX 50WX8 sulphonate salt H+ form, to remove sodium ion, and (ii) a column containing DOWEX 1X8 tertiary ammonium salt Cl− form which had been converted to the OH− form by washing with 3 Molar potassium hydroxide before use, to remove chloride ion. The diluted and treated solution had a sodium content of 30 ppm and a chloride ion content of 150 ppm by weight of the solution.

An antistatic coating composition was formed from the following components:

| | |
|---|---|
| Deionised mixture prepared as above | 672 ml |
| 'Ludox' TM (50% w/w aqueous colloidal silica of mean particle size 22 nm, supplied by DuPont) | 40 g |
| 'Synperonic' N (25% w/w aqueous solution of an ethoxylated nonyl phenol, supplied by ICI) | 6.25 g |
| Demineralised water | to 2500 ml |

The pH of the mixture was adjusted to 8.5 with aqueous ammonia.

An amorphous polyethylene terephthalate film was stretched to about 3.5 times its original dimensions in one direction and coated on one surface with the above formulation. The reverse surface was coated with an aqueous dispersion of a thermosetting acrylic copolymer in admixture with 'Synperonic' N, the thermosetting acrylic copolymer comprising a 46% by weight methyl methacrylate/46% ethyl acrylate/ 8% methacrylamide copolymer in admixture with about 25 weight % of a methylated melamine-formaldehyde resin. The film was then stretched by about 3.5 times in a direction perpendicular to the first, and heat set at a temperature of about 220° C. The final thickness of the polyethylene terephthalate substrate film was about 36 microns and that of the antistatic layer about 35 nm. The thickness of the acrylic coating on the reverse surface was about 25 nm.

The antistatic layer of the coated film had a surface resistivity of 11.1 logohms/square at 54% relative humidity and 20° C. After immersing the film in demineralised water for 2 hours and drying, the surface resistivity was 11.4 logohms/square. The coated film exhibited excellent optical characteristics, the haze, as measured by ASTM D 1003, being 0.2% and the total light transmission 91.1%.

EXAMPLE 2

11.9 liters of 'Elfugin' PF were diluted to 40 liters with demineralised water and pumped through two Barnstead D0803 high capacity mixed-bed cartridges (resin capacity 1870 grains as NaCl) at a rate of 530 ml/min. The treated solution had a sodium content of 160 ppm by weight.

An antistatic coating composition was formed from the following components:

| | |
|---|---|
| Deionised mixture prepared as above | 10.83 l |
| 'Ludox' TM | 649 ml |
| 'Renex' 690 (ethoxylated nonyl phenol) | 66 ml |
| Demineralised water | 45.25 l |

The pH of the mixture was adjusted to 8.5 with aqueous ammonia.

An amorphous polyethylene terephthalate film was stretched about 3.5 times its original dimensions in one direction and coated on one surface with the above formulation. The other surface of the film was uncoated. The film was then stretched about 3.5 times in a perpendicular direction and heat set at a temperature of about 220° C. The final thickness of the polyethylene terephthalate substrate was about 69 microns and that of the antistatic coating about 50 nm.

The coated film had a surface resistivity of 9.7 logohms/square at 68% relative humidity, 20° C., and a haze (ASTM D 1003) of 0.3%.

The increases in film yellowness and haze and decrease in polymer intrinsic viscosity, when coated scrap was reclaimed into virgin polymer at levels of up to 40% and refilmed, were of the same order as those observed with reclamation of uncoated scrap.

EXAMPLE 3

This is a comparative example not according to the invention.

The procedure of Example 1 was repeated save that the 'Elfugin' PF was not deionised before use. The thickness of the polyethylene terephthalate substrate and of the antistatic coating were the same as in Example 1.

The antistatic layer of the coated film had a surface resistivity of 10.4 logohms/square at 54% relative humidity but the haze (ASTM D 1003) was 1.2%. Most of the haze was due to the presence of a powdery bloom on the surface of the film which analysis indicated was primarily sodium chloride and which was readily wiped off.

EXAMPLE 4

The procedure of Example 1 was repeated save that the applied antistatic coating composition did not contain colloidal silica.

The coated film surface had a surface resistivity of 10.5 logohms/square at 54% relative humidity and 20° C., and a haze (ASTM D 1003) of 0.9%. The slip characteristics of the film were inferior to those of the film of Example 1.

EXAMPLES 5-13

Various film samples were prepared in accordance with Example 1, save that to the antistatic coating composition applied to each sample, other than the control (Example 5), was added an aqueous solution of a modifier salt as specified in the following Table. The modifier salt was present in an amount such that concentration of the modifier cation was 0.2% by weight based on the weight of the antistatic compound (a) and (b).

The surface restivity of the coated antistatic film surface was measured at 40% relative humidity and 20° C.

TABLE

| Example | Modifier Salt Cation | Anion | Surface Resistivity logohms/square |
|---|---|---|---|
| 5 | — | — | 12.9 |
| 6 | $NH_4^+$ | $Cl^-$ | 11.9 |
| 7 | $Li^+$ | $OH^-$ | 11.8 |
| 8 | $Na^+$ | $Cl^-$ | 11.9 |
| 9 | $K^+$ | $Cl^-$ | 12.0 |
| 10 | $Cs^+$ | $Cl^-$ | 12.0 |
| 11 | $Ca^{++}$ | $Cl^-$ | 11.9 |
| 12 | $Al^{+++}$ | $NO_3^-$ | 11.8 |
| 13 | $Zr^{++++}$ | $NO_3^-$ | 11.9 |

The haze value of each film sample listed in the Table was of the order of 0.2% (ASTM D 1003). Each sample exhibited excellent clarity.

What is claimed is:

1. An antistatic article comprising a self-supporting thermoplastics polymeric substrate having on at least one surface thereof an antistatic layer wherein the antistatic layer comprises (a) a polychlorohydrin ether of an ethoxylated hydroxyamine and (b) a polyglycol diamine, the total alkali metal content of components (a) and (b) not exceeding 0.5% of the combined weight of (a) and (b).

2. An article according to claim 1 wherein component (a) of the antistatic layer comprises a compound of the formula:

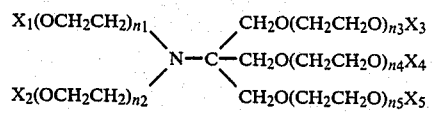

wherein each of $n_1$, $n_2$, $n_3$, $n_4$ and $n_5$ is an integer and the sum of $n_1$, $n_2$, $n_3$, $n_4$ and $n_5$ is from 5 to 20, and each of $X_1$, $X_2$, $X_3$, $X_4$ and $X_5$ which may be the same or different is -H or $-CH_2CH(OH)CH_2Cl$, with the proviso that at least one, and preferably two or more, of $X_1$, $X_2$, $X_3$, $X_4$ and $X_5$ is $-CH_2CH(OH)CH_2Cl$.

3. An article according to claim 1 wherein component (b) of the antistatic layer comprises a compound of the formula:

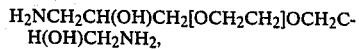

wherein $n_6$ is an integer of from 4 to 80.

4. An article according to claim 1 wherein components (a) and (b) are present in the antistatic layer in a weight ratio (a):(b) of from 0.5:1 to 5.0:1.

5. An article according to claim 1 wherein the antistatic layer includes a particulate slip agent.

6. An article according to claim 1 wherein the presence of a modifier salt containing a cation selected from the elements of Groups I-A, II-A, III-A and IV-B of the Periodic Table of the Elements, as hereinbefore defined.

7. An article according to claim 1 wherein the modifier salt is present in the antistatic layer in an amount such that the concentration of the cation does not exceed 0.3% by weight of the combined weight of (a) and (b).

8. An article according to claim 1 wherein the substrate comprises an oriented thermoplastics polymeric film.

* * * * *